(12) United States Patent
Maximino et al.

(10) Patent No.: US 10,814,825 B2
(45) Date of Patent: Oct. 27, 2020

(54) AIRBAG FOR AUTOMOTIVE VEHICLE AND METHOD OF MOUNTING A TETHER ON THE AIRBAG FABRIC OF AN AIRBAG

(71) Applicant: Dalphi Metal Espana, S.A., Vigo (ES)

(72) Inventors: Rui Maximino, Viana do Castelo (PT); Elsa Moreira, Ponte de Lima (PT); Fatima Sepulveda, Braga (PT); Philippe Schneeweiss, Nigran (ES); Pilar Abelenda, Vigo (ES); Pedro Jose Santin Navarro, Vigo (ES)

(73) Assignee: DALPHI METAL ESPANA, S.A., Vigo (ES)

( * ) Notice: Subject to any disclaimer, the term of this patent is extended or adjusted under 35 U.S.C. 154(b) by 81 days.

(21) Appl. No.: 16/154,762

(22) Filed: Oct. 9, 2018

(65) Prior Publication Data
US 2019/0111881 A1  Apr. 18, 2019

(30) Foreign Application Priority Data
Oct. 16, 2017 (DE) .......................... 10 2017 124 029

(51) Int. Cl.
| | |
|---|---|
| B60R 21/2338 | (2011.01) |
| B60R 21/232 | (2011.01) |
| B60R 21/235 | (2006.01) |
| B60R 21/213 | (2011.01) |
| B60R 21/237 | (2006.01) |
| B60R 21/00 | (2006.01) |

(52) U.S. Cl.
CPC ........ *B60R 21/2338* (2013.01); *B60R 21/232* (2013.01); *B60R 21/213* (2013.01); *B60R 21/237* (2013.01); *B60R 2021/0006* (2013.01); *B60R 2021/23386* (2013.01); *B60R 2021/23538* (2013.01); *B60R 2021/23576* (2013.01)

(58) Field of Classification Search
CPC .............. B60R 21/2338; B60R 21/232; B60R 2021/23576; B60R 2021/23386; B60R 2021/23538
See application file for complete search history.

(56) References Cited

U.S. PATENT DOCUMENTS 5,249,824 A * 10/1993 Swann .................. B60R 21/233
  280/729
5,478,114 A  12/1995 Maurer et al.
(Continued)

FOREIGN PATENT DOCUMENTS

| EP | 2995513 | 3/2016 |
|---|---|---|
| WO | 2017137243 | 8/2017 |

*Primary Examiner* — Drew J Brown
(74) *Attorney, Agent, or Firm* — Tarolli, Sundheim, Covell & Tummino LLP

(57) ABSTRACT

The invention relates to an airbag (12) for an automotive vehicle (10) comprising an airbag fabric (24) forming at least one airbag wall (26, 28) and an elongate flexible tether (20) for positioning the airbag (12) in its deployed state which extends from a first tether end (30) associated with the airbag fabric (24) to an opposite second tether end (32), wherein at the first tether end (30) the tether (20) is tightly sewn to the airbag fabric (24) by a fastening seam (36) and wherein the airbag fabric (24) includes a fabric reinforcing seam (38) which encloses at least part of the fastening seam (36). The invention further relates to a method of mounting a tether (20) on the airbag fabric (24).

16 Claims, 2 Drawing Sheets

(56) References Cited

U.S. PATENT DOCUMENTS

| | | | | |
|---|---|---|---|---|
| 6,073,961 | A * | 6/2000 | Bailey | B60R 21/2338 280/730.2 |
| 6,220,629 | B1 * | 4/2001 | Wipasuramonton | B60R 21/235 280/728.1 |
| 6,435,543 | B1 * | 8/2002 | Magoteaux | B60R 21/232 280/730.2 |
| 6,450,529 | B1 * | 9/2002 | Kalandek | B60R 21/213 280/730.2 |
| 9,211,864 | B2 | 12/2015 | Hock et al. | |
| 2006/0061074 | A1 * | 3/2006 | Aoki | B60R 21/213 280/730.2 |
| 2007/0164543 | A1 * | 7/2007 | Fukuda | B60R 21/232 280/729 |
| 2015/0191141 | A1 * | 7/2015 | Wang | B60R 21/23138 280/730.2 |
| 2017/0369024 | A1 * | 12/2017 | Ikenohata | B60R 21/232 |

\* cited by examiner

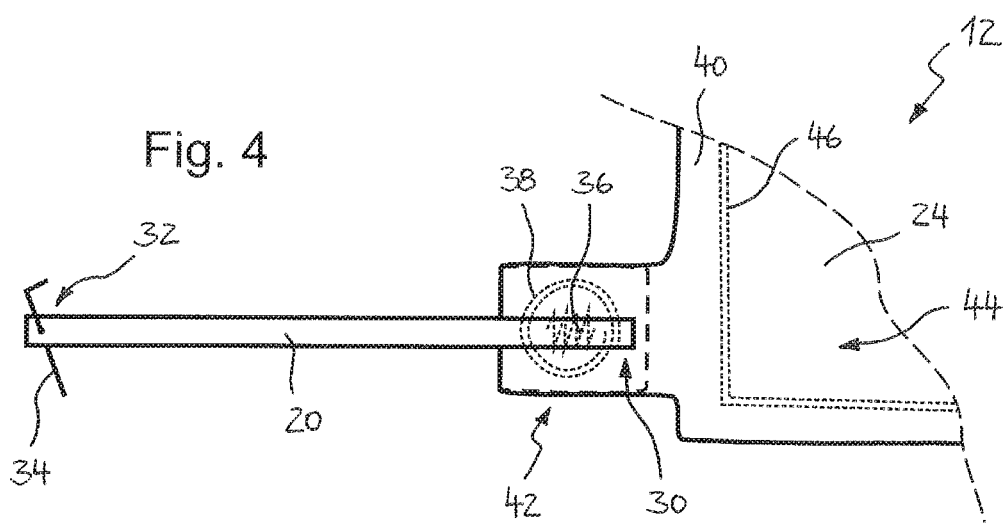
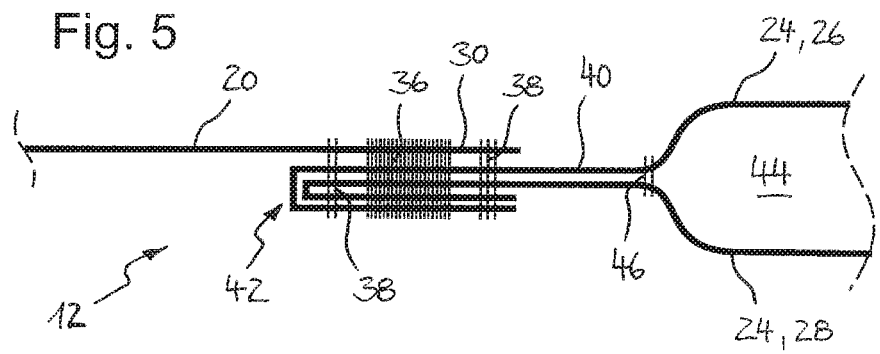
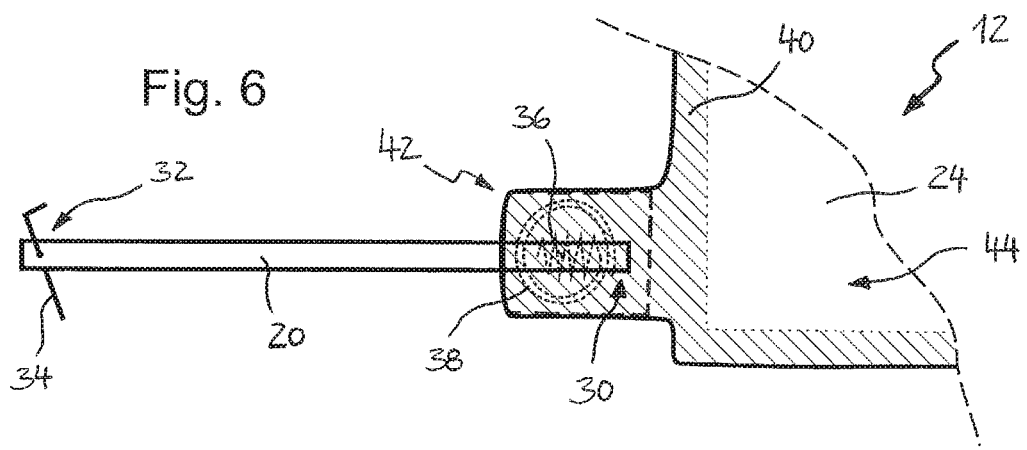
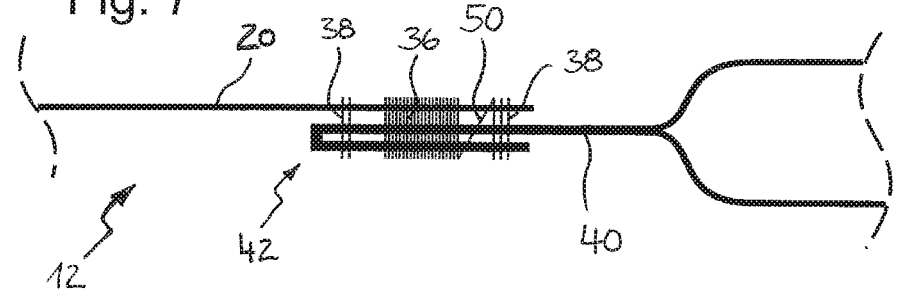

AIRBAG FOR AUTOMOTIVE VEHICLE AND METHOD OF MOUNTING A TETHER ON THE AIRBAG FABRIC OF AN AIRBAG

RELATED APPLICATION

This application claims priority from German Application No. 10 2017 124 029.2, filed Oct. 16, 2017, the subject matter of which is incorporated herein by reference in its entirety.

BACKGROUND OF THE INVENTION

The invention relates to an airbag for an automotive vehicle comprising an airbag fabric forming at least one airbag wall and an elongate flexible tether for positioning the airbag in its deployed state which extends from a first tether end associated with the airbag fabric to an opposite second tether end, wherein at the first tether end the tether is tightly joined to the airbag fabric by a fastening seam. Moreover, the invention also relates to a method of mounting a tether on the airbag fabric of an airbag.

Airbags, especially those for restraining vehicle occupants, in their deployed and inflated state have to adopt a defined position relative to the vehicle within the vehicle interior so as to achieve a predetermined restraint effect.

For mounting inside the vehicle, in several ones of the known airbags an edge of their filling opening is clamped to a housing part of the airbag module. Examples of those airbags are front airbags for the driver and the passenger.

Moreover, there are also side airbags, however, which are in the form of a curtain airbag, for example, and are fixed to the vehicle not only in the area of the filling hole but also by elongate flexible tethers. Said tethers are mounted both on the airbag and on the vehicle so as to bridge the space between the airbag and the respective anchoring point inside the vehicle. In the case of crash, the deployed airbag is held at its desired position by said tethers. Usually, the tethers are fastened to the A, B, C and/or D pillar(s) of the vehicle.

For mounting a tether on the vehicle usually a fastening element is provided which is arranged at the tether. In prior art, said fastening elements usually are tabs made from sheet metal. The tabs may be provided with a hook-type extension and/or an opening to snap the tabs into an opening of the vehicle body, for example, or to screw the tabs together with the vehicle body. An airbag mounted in this way is known from EP 2 995 513 A1, for example.

The tether is usually fastened on the airbag by sewing, wherein upon release of the airbag considerable tensile forces heavily straining the seam may occur within the tether.

SUMMARY OF THE INVENTION

It is therefore the object of the invention to provide an airbag in which the tether and the airbag fabric are connected in an especially reliable and highly loadable manner, said connection moreover being easy to manufacture with little expenditure of material and time.

In accordance with the invention, this object is achieved by an airbag of the afore-mentioned type in which the airbag fabric includes a fabric reinforcing seam enclosing at least part of the fastening seam, especially the entire fastening seam. The tether is preferably fastened to the airbag fabric on the edge side, for example at small edge extensions of the airbag fabric. During tensile tests it has turned out that the strength of the seam in said edge conditions is not determined by the tear or tensile strength of the individual threads but by the composite strength of the airbag fabric, as in the case of failure weft or warp threads are removed from the fabric composite. The fabric reinforcing seam easily stabilizes the fabric structure of the airbag fabric in the mounting area of the tether so that the seam is capable of absorbing tensile forces of the tether that are higher within the order of from 20% to 40% as compared to conventional designs. With a tensile load of the tether along a tether axis, load peaks will occur at the axial seam edges of the fastening seam so that preferably the entire fastening seam including the axial seam edges is enclosed by the fabric reinforcing seam and thus is within an area of increased composite strength of the airbag fabric.

The tether preferably is a textile tape, especially a fabric tape, which helps manufacture the tether with high tensile strength at low cost and fasten the same by sewing to the airbag fabric with little expenditure.

The airbag preferably is a curtain airbag, especially a curtain side airbag. Airbag modules of this type are particularly large and frequently include tethers so as to position the deployed airbag inside the vehicle, for example relative to the A pillar or C pillar of the vehicle.

According to one embodiment of the airbag, the first tether end is connected to the airbag fabric exclusively by the fastening seam. In this case, the fabric reinforcing seam may be produced already in advance, i.e. before the tether obstructing the sewing operation is positioned on the airbag fabric.

Alternatively, it is also imaginable that the first tether end is connected to the airbag fabric both by the fastening seam and by the fabric reinforcing seam. This offers the advantage that the tether can be arranged on the airbag fabric right at the beginning of mounting the tether and the sewing operation for the fastening seam and the fabric reinforcing seam need not be interrupted by positioning the tether. The additional fastening of the tether to the airbag fabric resulting from the fabric reinforcing seam rather is a subordinate side effect in this case. The main advantage in this embodiment resides in the reduced manufacturing effort by the immediately successive production of the fastening seam and the fabric reinforcing seams, wherein the seams can be produced especially separately or even coherently, viz. without any interruption of the seam as seam portions of one single seam.

Furthermore, a separate fabric tab may be provided which is connected to the airbag fabric by the fabric reinforcing seam. Such further fabric layer helps fixing the fabric reinforcing seam more strongly within the airbag fabric so that, in the case of tensile load of the tether, the fabric reinforcing seam offers increased resistance, especially against displacement inside the plane spanned by the airbag fabric.

In another embodiment of the airbag, the airbag fabric includes a fabric edge portion including a fabric extension, wherein the first tether end is connected to the fabric extension of the fabric edge portion by the fastening seam.

The fabric extension may be multi-layered by being folded at least once, wherein all fabric layers of the multi-layer fabric extension are connected to each other by the fabric reinforcing seam. Analogously to the afore-mentioned separate fabric tab, the fabric reinforcing seam is fixed more strongly within the airbag fabric by the additional fabric layers. In this embodiment, the multi-layer structure is achieved, however, by advantageous manufacture by simply folding over the fabric extension so that no additional separate fabric tabs are required.

In another embodiment of the airbag, the airbag fabric forms a first airbag wall for delimiting an inflatable airbag interior and an opposite second airbag wall connected to the first airbag wall by an airbag seam, the airbag seam separating the airbag interior from a fabric edge portion and the first tether end being sewn to the fabric edge portion. As a consequence, these are so-called "cut and sew" airbags for which a fabric cut is joined by at least one airbag seam so as to define an inflatable airbag interior.

According to an alternative airbag design, the airbag fabric forms a first airbag wall and an opposite second airbag wall for delimiting an inflatable airbag interior, wherein the edges of the airbag walls are interwoven and in the interwoven area the airbag walls form a fabric edge portion, the first tether end being sewn to the fabric edge portion. Accordingly, in this case so-called "one-piece woven" airbags are concerned in which the edges of flat fabric portions such as the first and second airbag walls are interwoven so that no seams are required for defining the inflatable airbag interior.

Preferably, the fabric reinforcing seam is a peripheral, especially spirally peripheral, seam extending over an angle of at least 360°, especially at least 720° around its seam center. In this way, inside the seam which is peripheral in an e.g. approximately circular or polygonal shape a portion of increased composite strength of the airbag fabric is formed.

Incidentally, the fabric reinforcing seam may as well be round, especially approximately circular, oval or polygonal, especially rectangular. In general, any seam shape producible with reasonable effort may be selected which encloses, i.e. encompasses the fastening seam over an angle of at least 360° in the circumferential direction.

According to another embodiment of the airbag, the fastening seam and the fabric reinforcing seam are directly merging and thus form two seam portions of one single seam. This entails fabrication benefits as the fastening seam and the fabric reinforcing seam in this case are produced in one sewing operation without any interruption.

Incidentally, the invention relates to a method of mounting a tether on an airbag fabric of an airbag, comprising the following steps of:
  a) applying a fabric reinforcing seam to the airbag fabric within a desired mounting area;
  b) applying the tether to the airbag fabric within the desired mounting area;
  c) sewing the tether to the airbag fabric by the fastening seam,
  wherein the fastening seam (36) and the fabric reinforcing seam (38) are arranged so that the fabric reinforcing seam (38) encloses at least part of the fastening seam (36).

In this way, an especially strong connection between the tether and the airbag fabric can be realized very quickly and easily. Optionally, within the desired mounting area prior to step a) a portion of the airbag fabric may be folded or a separate fabric tab may be arranged so that a multi-layer structure is resulting for further increasing the connecting strength.

In accordance with a method variant, step b) is carried out first and subsequently the tether is also sewn to the airbag fabric by the fastening seam.

Accordingly, following step b) the steps a) and c) may be carried out in any order, with the fastening seam and the fabric reinforcing seam being produced directly one after the other preferably without any interruption of the seam. In this case, especially little effort is required to fasten the tether to the airbag fabric, as the required seams are produced in one single sewing operation.

BRIEF DESCRIPTION OF THE DRAWINGS

Further features and advantages of the invention will be evident from the following description of preferred embodiments with reference to the drawings, wherein:

FIG. 4 shows a schematic detailed view of an airbag according to the invention in the area of a tether mounting according to another embodiment;

FIG. 5 shows a schematic detailed section across the tether mounting of the airbag according to FIG. 4;

FIG. 6 shows a schematic detailed view of an airbag according to the invention in the area of a tether mounting according to yet another embodiment; and FIG. 7 shows a schematic detailed section across the tether mounting of the airbag according to FIG. 6.

DESCRIPTION

Figure 1:
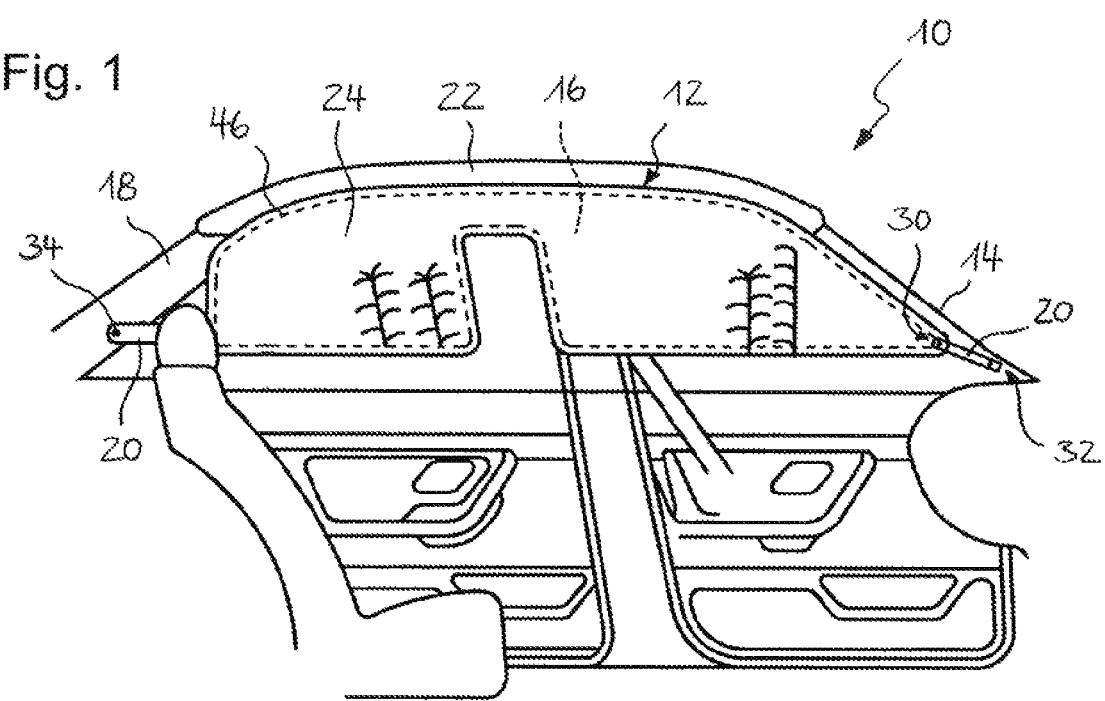
FIG. 1 shows a schematic interior view of a vehicle including a deployed airbag according to the invention.

FIG. 1 illustrates an airbag 12 arranged laterally inside the vehicle 10 which is a curtain airbag and extends from an A pillar 14 over a B pillar 16 to a C pillar 18 of the vehicle 10.

In this type of airbag, usually tethers 20 are provided for positioning the airbag 12 in its deployed inflated state, wherein considerable tensile forces may act on said tethers 20 during deployment of the airbag 12. In general, the inventive idea is not limited to curtain airbags, however, but may also be easily conferred upon any other type of airbag including corresponding tethers 20.

In the folded state, the curtain airbag is disposed at least partially beneath a cover or lining 22.

According to FIG. 1, the shown curtain side airbag is in a deployed inflated state, however, for protecting especially the heads of front and rear passengers.

Concretely speaking, in the mounted state the airbag 12 is connected along its upper edge to a roof rail of the vehicle 10 at plural fastening points not specified in detail. Furthermore, a front tether 20 is provided by which a front end of the airbag 12 is connected to the A pillar 14 of the vehicle 10 and a rear tether 20 is provided for fastening a rear end of the airbag 12 to the C pillar 18 of the vehicle 10.

Figure 2:
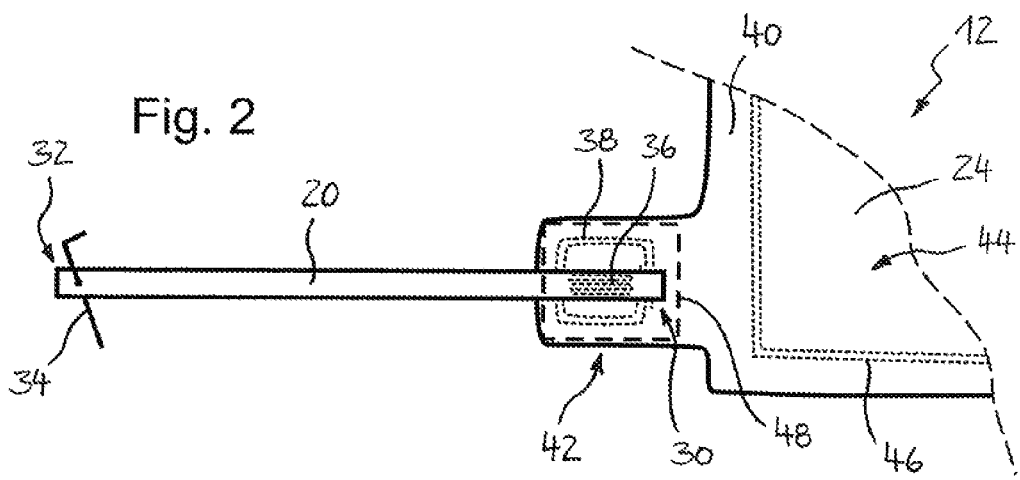
FIG. 2 shows a schematic detailed view of an airbag according to the invention within the area of a tether mounting according to one embodiment.
Figure 3:
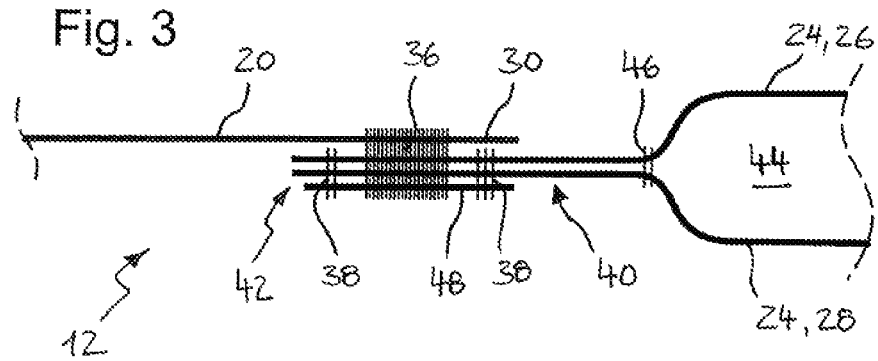
FIG. 3 shows a schematic detailed section across the tether mounting of the airbag according to FIG. 2.

FIGS. 2 and 3 illustrate a detailed view and, resp., a detailed section of the airbag 12 in the mounting area of the (rear) tether 20 on an airbag fabric 24.

The inflatable airbag 12 comprises the airbag fabric 24 forming at least one airbag wall 26, 28 as well as an elongate flexible tether 20 for positioning the airbag 12 in its deployed state according to FIG. 1, the tether 20 extending from a first tether end 30 associated with the airbag fabric 24 to an opposite second tether end 32.

The tethers 20 used are especially textile tapes, specifically fabric tapes, as they are capable of reliably absorbing high loads upon release of the airbag module and the resulting deployment of the airbag 12 and moreover can be easily manufactured at low cost.

The tether 20 is sewn at its first tether end 30 to the airbag fabric 24, whereas at the second tether end 32 a fastening element 34 is arranged for mounting the airbag 12 to the vehicle 10. Concretely speaking, the fastening element 34 is a sheet metal tab, for example, and anchors the second tether end 32 to the vehicle 10, especially to a vehicle body.

By way of FIGS. 2 and 3 it is illustrated that the tether 20 is tightly sewn to the airbag fabric 24 at the first tether end 30 by a fastening seam 36, wherein the airbag fabric 24 further includes a fabric reinforcing seam 38 which encloses at least part of the fastening seam 36, especially the entire fastening seam 36.

The fastening seam 36 in this case is a zigzag seam, for example, which in FIG. 2 extends transversely to a longitudinal tether direction of the tether 20, but which alternatively may as well extend in the longitudinal tether direction of the tether 20 (cf. FIGS. 4 and 6). As a matter of course, for the fastening seam 36 any other suitable seam type may be chosen instead of a zigzag seam.

The fabric reinforcing seam 38 is a seam peripheral in frame shape around a seam center which extends over an angle of at least 360°, especially at least 720° around the seam center.

According to FIG. 2, the fabric reinforcing seam 38 concretely is a spirally peripheral seam extending over an angle of slightly more than 720° around the fastening seam 36, wherein the radially adjacent spiral portions are close to each other and are approximately polygonal, especially approximately rectangular.

As an alternative, also other spiral shapes are imaginable, however, for example oval or approximately circular shapes (cf. also FIGS. 4 and 6). The spiral geometry to a certain extent influences the loading capacity of the tether mounting, wherein maximum tensile forces for the tether 20 have been obtained by an approximately rectangular shape according to FIG. 2.

In general, any seam type which encloses the fastening seam 36, viz. encompasses the fastening seam 36 over an angle of at least 360° in the circumferential direction, may be chosen for the fabric reinforcing seam 38. In particular, the fabric reinforcing seam 38 is round, especially approximately circular, oval or polygonal, especially rectangular.

The airbag fabric 24 includes a fabric edge portion 40 including a fabric extension 42, wherein the first tether end 30 is connected to the fabric extension 42 of the fabric edge portion 40 by the fastening seam 36. Furthermore, for delimiting an inflatable airbag interior 44 the airbag fabric 24 forms a first airbag wall 26 and an opposite second airbag wall 28 connected to the first airbag wall 26 by an airbag seam 46, with the airbag seam 46 separating the airbag interior 44 from the fabric edge portion 40 and the first tether end 30 being sewn to the fabric edge portion 40.

In the embodiment according to FIGS. 2 and 3, the first tether end 30 is connected to the airbag fabric 24 exclusively by the fastening seam 36. In this way, the fastening seam 36 can be produced before the tether 20 is positioned on the airbag, for example along with the airbag seam 46. Thus, the sewing operation is not obstructed by the tether 20.

In addition, in this embodiment a separate fabric tab 48 is provided which is connected to the airbag fabric 24 by the fabric reinforcing seam 38 and serves for stronger fixation of the fabric reinforcing seam 38 within the airbag fabric 24.

FIGS. 4 and 5 illustrate a detailed view and, resp., a detailed section of the airbag 12 in the mounting area of the (rear) tether 20 on an airbag fabric 24 according to another embodiment. In order to avoid repetitions, the foregoing description is basically referred to and hereinafter merely distinctive features of this embodiment shall be discussed.

As compared to the embodiment according to FIGS. 2 and 3, the fabric extension 42 of the airbag 12 according to FIGS. 4 and 5 is multi-layered by being folded once, with all fabric layers of the multi-layer fabric extension 42 being connected to each other by the fabric reinforcing seam 38. Said multi-layer structure entails stronger fixation of the fabric reinforcing seam 38 within the airbag fabric 24, wherein a separate additional fabric tab 48 can be dispensed with, however.

Further, the first tether end 30 according to FIGS. 4 and 5 is connected to the airbag fabric 24 both by the fastening seam 36 and by the fabric reinforcing seam 38. This offers the advantage that the tether 20 can be arranged on the airbag fabric 24 right at the beginning of mounting the tether and the sewing operation for the fastening seam 36 and the fabric reinforcing seam 38 need not be interrupted by positioning the tether 20.

FIGS. 6 and 7 illustrate a detailed view and, resp., a detailed section of the airbag 12 within the mounting area of the (rear) tether 20 on an airbag fabric 24 according to yet another embodiment. In order to avoid repetitions, the foregoing description is basically referred to and hereinafter merely distinctive features of this embodiment shall be discussed.

In contrast to the foregoing embodiments, the airbag fabric 24 forms a first airbag wall 26 and an opposite second airbag wall 28 for delimiting the inflatable airbag interior 44, with the edges of the airbag walls 26, 28 being interwoven, wherein the interwoven area emphasized in hatched lines in FIG. 6 defines the fabric edge portion 40 and wherein the first tether end 30 is sewn to the fabric edge portion 40. Said interweaving of the opposite airbag walls 26, 28 replaces the airbag seams 46 shown in FIGS. 2 to 5.

Otherwise, the fabric extension 42 is double-layered by being folded once analogously to FIGS. 4 and 5, wherein the two fabric layers of the double-layer fabric extension 42 are connected to each other by the fabric reinforcing seam 38.

Moreover, the first tether end 30 of the tether 20 is connected to the airbag fabric 24 both by the fastening seam 36 and by the fabric reinforcing seam 38, wherein the fastening seam 36 and the fabric reinforcing seam 38 do not constitute two seams separated from each other, in contrast to the airbag 12 according to FIGS. 4 and 5, but are directly merging and thus form two seam portions of one single seam. This is indicated in FIG. 7 by a seam 50 and results in an especially quick tether mounting, as the fastening seam 36 and the fabric reinforcing seam 38 are produced in one sewing operation without any interruption.

In general, the method of mounting the tether 20 on the airbag fabric 24 comprises the steps of:
  a) applying the fabric reinforcing seam 38 to the airbag fabric 24 within a desired mounting area;
  b) applying the tether 20 to the airbag fabric 24 within the desired mounting area; and
  c) sewing the tether 20 to the airbag fabric 24 by the fastening seam 36,
wherein the fastening seam 36 is arranged so that the fabric reinforcing seam 38 encloses at least part of the fastening seam 36.

In the embodiment of the airbag 12 according to FIGS. 2 and 3, the method steps are preferably carried out in the stated order a) to c), wherein within the desired mounting area prior to step a) optionally a portion of the airbag fabric 24 may be folded over or a separate fabric tab 48 may be disposed so that a multi-layer structure further increasing the composite strength is resulting.

In the embodiment of the airbag 12 according to FIGS. 4 to 7, step b) is preferably carried out first and subsequently the tether 20 is also sewn to the airbag fabric 24 by the fastening seam 36.

Following step b), the steps a) and c) may be carried out in any order, wherein in the embodiment of the airbag 12 according to FIGS. 6 and 7 the fastening seam 36 and the fabric reinforcing seam 38 are produced directly one after the other without any interruption of the seam.

The invention claimed is:

1. An airbag for an automotive vehicle (10), comprising:
an airbag fabric (24) forming at least one airbag wall (26, 28) as well as an elongate flexible tether (20) for positioning the airbag (12) in its deployed state which extends from a first tether end (30) associated with the airbag fabric (24) to an opposite second tether end (32),
wherein in the area of the first tether end (30) the tether (20) is tightly sewn to the airbag fabric (24) by a fastening seam (36),
wherein the airbag fabric (24) includes a fabric reinforcing seam (38) enclosing at least part of the fastening seam (36).

2. The airbag according to claim 1, wherein the tether (20) is a textile tape.

3. The airbag according to claim 1, wherein the first tether end (30) is connected to the airbag fabric (24) exclusively by the fastening seam (36).

4. The airbag according to claim 1, wherein a separate fabric tab (48) connected to the airbag fabric (24) by the fabric reinforcing seam (38) is provided.

5. The airbag according to claim 1, wherein the airbag fabric (24) includes a fabric edge portion (40) comprising a fabric extension (42), with the first tether end (30) being connected to the fabric extension (42) of the fabric edge portion (40) by the fastening seam (36).

6. The airbag according to claim 5, wherein the fabric extension (42) is multi-layered by being folded at least once, with all fabric layers of the multi-layer fabric extension (42) being connected to each other by the fabric reinforcing seam (38).

7. The airbag according to claim 1, wherein for delimiting an inflatable airbag interior (44) the airbag fabric (24) forms a first airbag wall (26) and an opposite second airbag wall (28) connected to the first airbag wall (26) by an airbag seam (46), wherein the airbag seam (46) separates the airbag interior (44) from a fabric edge portion (40) and wherein the first tether end (30) is sewn to the fabric edge portion (40).

8. The airbag according to claim 1, wherein for delimiting an inflatable airbag interior (44) the airbag fabric (24) forms a first airbag wall (26) and an opposite second airbag wall (28), with the edges of the airbag walls (26, 28) being interwoven and in the interwoven area the airbag walls forming a fabric edge portion (40), wherein the first tether end (30) is sewn to the fabric edge portion (40).

9. The airbag according to claim 1, wherein the fabric reinforcing seam (38) is a peripheral seam extending over an angle of at least 360° around its seam center.

10. The airbag according to claim 1, wherein the fabric reinforcing seam (38) is at least one of round, circular, oval, polygonal, and rectangular.

11. The airbag according to claim 1, wherein the fastening seam (36) and the fabric reinforcing seam (38) are directly merging and constitute two seam portions of one single seam.

12. The airbag according to claim 1, wherein the fabric reinforcing seam (38) is a peripheral seam extending over an angle of at least 720° around its seam center.

13. The airbag according to claim 1, wherein the fabric reinforcing seam (38) is a spirally peripheral seam extending over an angle of at least 360° around its seam center.

14. A method of mounting a tether (20) on an airbag fabric (24) of an airbag (12), comprising the following steps of:
applying a fabric reinforcing seam (38) to the airbag fabric (24) within a desired mounting area;
applying the tether (20) to the airbag fabric (24) within the desired mounting area; and
sewing the tether (20) to the airbag fabric (24) by a fastening seam (36),
wherein the fastening seam (36) and the fabric reinforcing seam (38) are disposed so that the fabric reinforcing seam (38) encloses at least part of the fastening seam (36).

15. The method according to claim 14, wherein the step of applying the tether (20) to the airbag fabric (24) is carried out first and the tether (20) is subsequently also sewn to the airbag fabric (24) by the fastening seam (36).

16. The method according to claim 15, wherein the steps of applying a fabric reinforcing seam (38) to the airbag fabric (24) and sewing the tether (20) to the airbag fabric (24) are carried out following the step of applying the tether (20) to the airbag fabric (24) in any order, wherein the fastening seam (36) and the fabric reinforcing seam (38) are produced directly one after the other without any interruption of the seam.

* * * * *